Figures 1, 2:
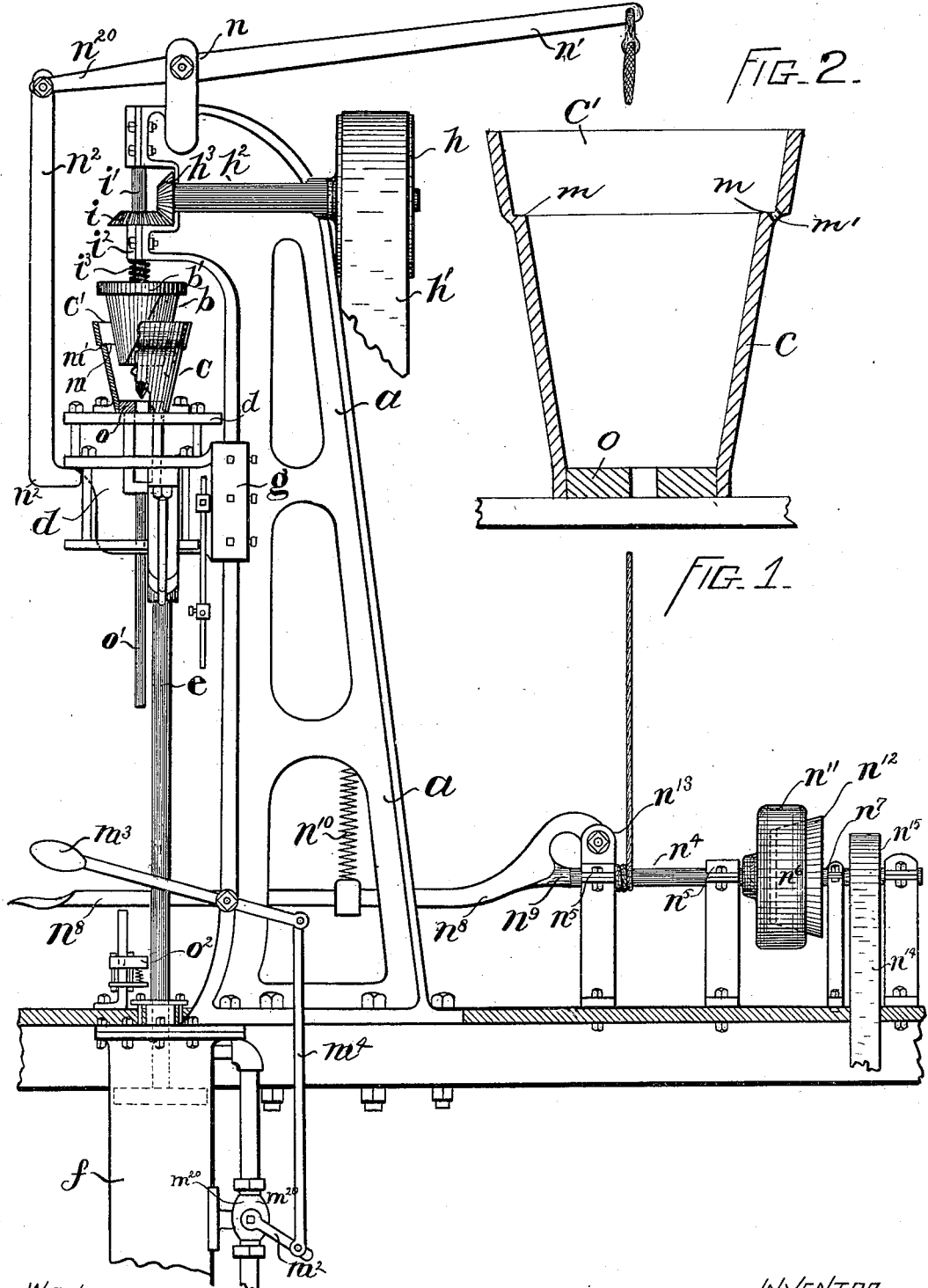

No. 639,514. Patented Dec. 19, 1899.
H. N. BROOKS.
MACHINE FOR MOLDING FLOWER POTS.
(Application filed Jan. 5, 1899.)
(No Model.)

WITNESSES.
Ralph F. Pearson.
James P. Forrest.

INVENTOR.
Harry N. Brooks
By his attorney
Harry O. Robinson.

UNITED STATES PATENT OFFICE.

HARRY N. BROOKS, OF ORRINGTON, MAINE.

MACHINE FOR MOLDING FLOWER-POTS.

SPECIFICATION forming part of Letters Patent No. 639,514, dated December 19, 1899.

Application filed January 5, 1899. Serial No. 701,184. (No model.)

*To all whom it may concern:*

Be it known that I, HARRY N. BROOKS, a citizen of the United States of America, and a resident of Orrington, county of Penobscot, State of Maine, have invented certain new and useful Improvements in Machines for Molding Flower-Pots, of which the following is a specification.

In the manufacture of flower-pots or other ware from clay or similar material upon a molding-machine great pressure is required to force the clay contained in the mold against the revolving core to form the article. The mold is usually mounted upon a base-plate and supported upon a piston-rod working in a steam cylinder adapted to furnish power to press the clay in said mold against a revolving core to form the article, and the pressure required rapidly increases while the article is being formed, rising to a maximum as it is completed. In practice great difficulty has been experienced to adapt a steam-cylinder to produce the increasing pressure necessary to uniformly force the mold up over the core to form perfect articles.

The object of this invention is to provide mechanism constructed and arranged to operate in connection with the piston-rod to increase the pressure upon the mold as the article is being formed, to uniformly force said mold over the core, to vary the intensity of the pressure as the mold advances, and to quickly apply or remove said pressure therefrom when the article is completed.

In accordance with this invention a lifting-arm is constructed and arranged to press the mold up over the core, engaging the base-plate of said mold, and a lifting-lever is pivoted to said lifting-arm and movably secured to the frame of the machine. Mechanism is provided for operating said lifting-lever to raise said lifting-arm, and a clutching device is provided for quickly throwing the operating mechanism for raising said lifting-lever into and out of engagement therewith.

Figure 1 of the drawings represents a machine for molding flower-pots or similar ware, showing the mechanism for increasing the pressure upon the mold as the article is formed; and Fig. 2 shows an improvement in the construction of the mold to be hereinafter referred to.

The letter $a$ denotes the frame of the machine, having arranged near its upper end a revolving core $b$ for forming the inside of the article to be molded. A mold $c$ is supported upon a base-plate $d$, mounted upon a piston-rod $e$, adapted to work up and down in a steam-cylinder $f$, and a guide $g$ is provided for keeping said mold $c$ in alinement with said revolving core $b$ as it presses the clay against said core $b$ to form the article, consisting of a block $g$, having guideways engaging the frame $a$ of the machine. A driving-pulley $h$, carrying a driving-belt $h'$, rotates said core $b$, having secured thereto a shaft $h^2$, turning in bearings in the frame $a$, and a bevel-gear $h^3$ is arranged upon the end of said shaft $h^3$ to engage a similar bevel-gear $i$, secured to the upper end of a short vertical shaft $i'$, working in bearings $i^2$ in said frame $a$. Said vertical shaft $i'$ is arranged to support said core $b$, and a stout spiral spring $i^3$ passes around said shaft $i'$ between the bearing and said core $b$ to take up the thrust of said mold $c$.

The steam-cylinder $f$ is provided to furnish power to work the machine and is secured to the frame $a$ thereof, and said steam-cylinder $f$ is provided with a three-way valve $m^{20}$ and pipes leading to each end thereof and arranged to admit steam thereto to work the piston-rod $e$ and a throttle-valve $m^2$. A hand-lever $m^3$ and an intermediate connecting-lever $m^4$ are provided and pivoted to the frame $a$ of the machine to control the admission of steam to said cylinder $f$.

A movable plate $o$ forms the bottom of the mold $c$ while the article is being formed, and to remove the finished article from said mold a rod $o'$ is secured to said plate $o$, constructed and arranged to engage a stop $o^2$ as said mold $c$ descends after the article has been formed, which arrests further downward motion of said plate $o$, and the article being supported thereon clear from said mold $c$ may be removed from the machine by the operator.

A lever $n$ is pivoted to the upper end of the frame of the machine, and a lifting-arm $n^2$ is pivotally secured to said lever $n$, the lower end of which is adapted to engage the base-plate $d$ of the mold $c$. A rope or chain $n^3$ connects the long arm $n'$ of said lever $n$ with a shaft $n^4$, working in bearings $n^5$, and means, to be described, is provided to turn said shaft $n^4$ to wind thereon said rope or chain $n^3$, and as said rope or chain $n^3$ is wound upon said shaft $n^4$ said long arm $n'$ of said lever $n$ descends and the short arm $n^{20}$ thereof rises, carrying with it said lifting-arm $n^2$ and said mold $c$, engaged by it, up over the core $b$ with great force. A clutch $n^6$ is employed to connect said shaft $n^4$ with a driving-shaft $n^7$ to furnish power, and a foot-lever $n^8$ is provided to operate said clutch $n^6$ and arranged to be worked by the foot of the operator. Said clutch $n^6$ may be of any well-known or suitable construction and is shown in the drawings as formed of a tapering pulley $n^{12}$, secured to said driving-shaft $n^7$, and a pulley $n^{11}$, secured to said shaft $n^4$, having a recess into which said tapering pulley $n^{12}$ enters, and to operate said clutch $n^6$ said foot-lever $n^8$ is pivoted to an upwardly-projecting portion $n^{13}$ of the post supporting the bearing $n^5$ of said shaft $n^4$ next the end thereof, on which the rope or chain $n^3$ is wound, and said foot-lever $n^8$ is provided with a portion $n^9$, adapted to engage the end of said shaft $n^4$, and a spring $n^{10}$ normally supports said lever $n^8$ in a position out of engagement with the end of said shaft $n^4$.

To operate the lifting-arm $n^2$ to raise the mold $c$, the foot-lever $n^8$ is pressed down, the projecting portion $n^{13}$ thereof causing the shaft $n^4$ to advance slightly and force the recessed pulley $n^{11}$ into frictional engagement with the tapering pulley $n^{12}$, mounted upon the driving-shaft $n^7$, revolving said shaft $n^4$, the rope or chain $n^3$, secured thereto, being wound thereon, and the long arm $n'$ of the lever $n$ descends, elevating said lifting-arm $n^2$ and carrying said mold $c$ with it up over the revolving core $b$ with great force.

The operation of the molding-machine is as follows: Steam is supplied to the cylinder $f$ to work the piston-rod $e$, power is furnished to the driving-belt $h'$ to revolve the core $b$, and power is also furnished to the belt $n^{14}$, carried upon the pulley $n^{15}$ to revolve the driving-shaft $n^7$ of the clutch mechanism to operate the lifting-arm $n^2$. The mold $c$ being in a position out of engagement with the core $b$ a ball of clay is introduced into said mold $c$, and steam is turned on by the hand-lever $m^3$, which enters the cylinder $f$ and raises the piston-rod $e$, carrying said mold $c$ up over the revolving core $b$ and forcing the clay against said core $b$. As the article is formed the pressure required to force said mold $c$ up over said core $b$ rapidly increases, and when said article is about half finished the lifting-arm $n^2$ is moved into engagement with the base-plate of said mold $c$ by the hand of the operator to complete the molding of the article. The foot-lever $n^8$ is depressed, causing the two members $h^{11}$ and $h^{12}$ of the clutch $n$ to frictionally engage each other, when the driving-shaft $n^7$ will revolve the shaft $n^4$, the rope or chain $n^3$ being wound thereon, depressing the long arm $n'$ of the lever $n$ and raising said lifting-arm $n^2$, which carries with it up over said core $b$ said mold $c$, with uniform upward motion until the upper rim $c'$ thereof engages a flange $b'$, formed upon said core $b$, when the molding of the article is completed. The mechanism operating the lifting-arm $n^2$ is thrown out of engagement therewith by removing pressure from the foot-lever $n^8$, and the hand-lever $m^3$ is operated to reverse the steam-pressure upon the piston-rod $e$, when the mold $c$ descends. The rod $o'$, secured to the movable bottom of said mold $c$, striking upon a stop $o^2$, disengages the article from said mold $c$, and a further downward motion of said mold leaves the article supported upon said movable bottom $o$, when it may be removed from the machine by the operator.

Flower-pots or similar ware are usually provided with a flange formed upon the outside surface thereof, near the top of the pot, for convenience in handling, and a mold provided with such a flange is shown in Fig. 2 of the drawings. In practice air is confined between the shoulder of the mold and the clay while the pot is being molded, blemishing the finished pot by forming furrows in the outside surface thereof in its effort to escape from said mold.

In Fig. 2 of the drawings a section of a mold for making flower-pots is shown provided with a small hole $m'$ through the shoulder $m$, which forms the flange on the outside of the pot to allow the escape of the confined air, and the metal of the mold is cut away nearly through to the inside thereof, so that the clay will not plug the hole. A mold provided with a vent-hole, as explained above, for the escape of the confined air forms the articles without marks or blemishes.

I claim—

1. In a machine for molding flower-pots or similar ware from clay, a revolving core, a mold, a base-plate for said mold, a lifting-arm pivoted above said mold constructed and arranged to engage said base-plate, mechanism for raising said lifting-arm to force said mold up over said core to mold the article, a driving-shaft to furnish power, a friction-clutch connecting said mechanism with said driving-shaft and means for operating said clutch to throw said mechanism out of engagement with said driving-shaft, substantially as described.

2. In a machine of the kind described, a revolving core, a mold, a base-plate for said mold, a lifting-arm constructed and arranged to engage said base-plate, a lever to raise said lifting-arm to press said mold up over said core to form the article, a drum, a rope or chain secured to said lever and adapted to be wound upon said drum to depress said lever, a driving-shaft, a friction-clutch connecting said drum with said driving-shaft and means for operating said clutch to disconnect said drum from said driving-shaft, substantially as described.

3. In a machine of the kind described, a revolving core, a mold, a base-plate supporting said mold, a steam-cylinder, a piston-rod arranged to work up and down therein to press said mold up over said core to form the article, a lifting-arm constructed and arranged to work in connection with said piston-rod engaging said base-plate and means for raising said lifting-arm to force said mold up over said core to form the article, substantially as described.

4. In a machine of the kind described, a revolving core, a mold, a base-plate supporting said mold, a steam-cylinder, a piston-rod arranged to work up and down therein to press said mold up over said core, a lifting-arm engaging said base-plate constructed and arranged to work in connection with said piston-rod, a lever pivoted to said lifting-arm and means for depressing said lever to raise said lifting-arm, substantially as described.

Signed by me at Bangor, Maine, this 22d day of December, 1898.

HARRY N. BROOKS.

Witnesses:
WM. B. PEIRCE,
HARRY O. ROBINSON.